3,515,589
VINYL-COATED ELECTRIC WIRE
Hiroshi Izumi, Toyama-shi, Tomonori Sengoku, Nameri-kawa-shi, and Sumio Igarashi and Kosaku Kamio, Uozu-shi, Japan, assignors to Nippon Carbide Kogyo Kabushiki Kaisha, Tokyo, Japan
No Drawing. Filed July 7, 1967, Ser. No. 651,680
Claims priority, application Japan, July 12, 1966, 41/45,047
Int. Cl. B44c 1/36; H01b 3/44
U.S. Cl. 117—232                    3 Claims

ABSTRACT OF THE DISCLOSURE

The present invention provides an electric wire (herein the term "wire" includes cables) coated with a resin composition comprising (a) 100 parts by weight of a vinyl chloride containing 2–16% by weight of a monoolefin not higher than $C_4$, preferably ethylene and (b) from 1–40 parts by weight of a plasticizer, the resin composition having a stiffness modulus of 1000–250 kg./cm.$^2$ (determined at 25° C.). This resin-coated wire is much improved in properties such as flexibility, insulation resistance, weather resistance, heat resistance and aging resistance, compared with the conventional one coated with polyvinyl chloride resin composition.

---

This invention relates to a resin-coated electric wire, more particularly to a wire coated with a composition comprising essentially vinyl chloride-monoolefin copolymer and a plasticizer, which is much improved in properties such as flexibility, insulation resistance, weather resistance, heat resistance and aging resistance, compared with the conventional one coated with polyvinyl chloride resin composition.

The conventional wire coated with polyvinyl chloride resin composition is excellent in some properties such as workability, resistances to flaming, oils and chemicals, but not satisfactory in other some properties required for coated electric wires. First of all, generally for coated wires, are required high flexibility and high insulation resistance at the same time. However, the conventional polyvinyl chloride coated wire has a serious defect that if flexibility is high, insulation resistance is low and on the contrary if insulation resistance is high, flexibility is low. Particularly, vinyl chloride homopolymer itself has a high volume resistivity (ohm-cm.) of $10^{16}$ order, nevertheless upon application the resistivity is decreased to $10^{13}$ order because the homopolymer must be compounded with a large amount of plasticizer in order to impart flexibility. Further, the conventional polyvinyl chloride wire is not satisfactory in resistances to weather, heat and aging. As the result, the conventional wire has many disadvantages such that its allowable voltage range is limited (maximum 600 volts) and its allowable temperature range is also narrow (maximum 60° C.).

An object of the present invention is to provide a resin-coated electric wire having high flexibility and high insulation resistance at the same time.

Another object is to provide a resin-coated electric wire having improved resistances to weather, heat and aging.

The present invention provides an electric wire coated with a resin composition comprising (a) 100 parts by weight of a vinyl chloride copolymer containing from 2% to 16% by weight of a monoolefin having carbon atoms not more than 4 and (b) from 1 to 40 parts by weight of a plasticizer, the resin composition having a stiffness modulus from 1000 to 250 kg./cm.$^2$ (determined at 25° C.).

In this application, the term "electric wire" means wires not only for low voltage but also for high voltage and cables; for example, 600 v. indoor and outdoor wires, flexible code, OW wire, DV wire, SV wire, vinyl captire cable, high voltage cable, control vinyl cable, signal vinyl cable, and vinyl sheath wires and cables.

The copolymer, one of the essential components of the resin composition used in the present invention, is generally prepared by copolymerizing vinyl chloride with a monolefin not higher than $C_4$. The copolymerization may be ionic or radical type. When the copolymer is prepared by radical copolymerization, there can be adopted a polymerization process using water as medium, such as emulsion or suspension polymerization, and the preparation is very convenient.

The monolefin to be contained in the copolymer is one or more of ethylene, propylene, butene-1, butene-2, and isobutene. Among these monolefins, ethylene is most preferably used, because it is inexpensive and convenient to be copolymerized and further the properties of the resultant copolymer are excellent.

If the monolefin content in the (a) component, the copolymer, is less than 2% by weight, the improvement in heat-resistance is insufficient. On the other hand, if more than 16% by weight, any further substantial increase in the effect can not be observed. In addition, a vinyl chloride/monolefin copolymer containing up to 16% by weight of ethylene can be produced very conveniently, because the copolymerization can be conducted very easily under relatively lower pressures (e.g. about 50 kg./cm.$^2$).

The plasticizer, which is the (b) component in the resin composition, includes phthalate derivatives such as di-2-ethyl-hexyl phthalate, N-octyl phthalate, butyl-lauryl phthalate, butyl-benzyl phthalate, di-isodecyl phthalate, butyl-octyl phthalate, butyl-phthalyl-butyl-glycolate and ethyl-phthalyl-ethyl-glycolate; phosphate derivatives such as tricresylphosphate, trioctylphosphate and triphenylphosphate; dibasic acid ester derivatives such as dioctyladipate, dioctylsebacate, dibutylsebacate, dioctylazelate and diisodecyl-adipate; epoxy plasticisers such as epoxides of soya-bean oil fatty acid, alkyl-epoxy-stearate, dioctyl-epoxy-hexahydro-phthalate and epoxy linseed oil; chlorinated paraffin; chlorinated fatty acid esters; and polyester plasticizers such as polyesters of adipic acid, sebasic acid and phthalic acid.

The proportion of the (b) component (plasticizer) is 1–40 parts by weight per 100 parts of the (a) component (copolymer). If larger than 40 parts, the improvements in heat resistance and insulation resistance are insufficient.

Further, the stiffness modulus of the resulting resin composition must be 1000–250 kg./cm.$^2$. If over 1000 kg./cm.$^2$, the flexibility is so poor as not passing the standard of JIS–C–3307 defining winding property at low temperature. On the other hand, if smaller than 250 kg./cm.$^2$, the tensile strength is so poor as not capable of standing practical applications.

The other components of the resin composition used in the present invention are agents well known in this field, including stabilizers (0.5–10 phr.) (herein phr. means per hundred resin copolymer by weight) such as dibasic lead phoshite and tribasic lead sulfate; lubricants (0.2–2.0 phr.)

such as butyl stearate, mineral oil and low molecular weight polyethylene; antioxidants (0.05–0.3 phr.) such as triphenyl phosphite and bisphenol A; ultraviolent absorbers (0.05–0.3 phr.) such as benzophenone derivatives and benzotriazole derivatives; fillers (0–70 phr.) such as calcium carbonate and barium sulfate; and pigments (0.0001–3.0 phr.) such as $TiO_2$ and Phthalocyanine Blue. Resineous polymers or copolymers other than the present copolymer may be compounded in such a small proportion as not departing from the sprit of the present invention.

In the present invention, it is especially preferable that 0.5–3 phr. of dibasic lead phosphite are compounded as stabilizer. Though it is known that dibasic lead phosphite improves weather resistance of polyvinyl chloride resin composition, we have found that it improves not only weather resistance but also heat resistance for the vinyl chloride/monoolefin copolymer—a plasticizer resin composition of the present invention as shown in the following.

| Composition (parts by weight): | A | B |
|---|---|---|
| Vinyl chloride/ethylene copolymer (ethylene content 8.7 wt. percent) | 100 | 100 |
| Plasticizer N–DOP | 20 | 20 |
| Tribasic lead sulfate | 6.0 | 4.5 |
| Dibasic lead phosphite | 0 | 1.5 |
| Lead stearate | 1.5 | 1.5 |

| | Elongation residual ratio (percent)[1] | |
|---|---|---|
| | A | B |
| Heat temperature: | | |
| 140° C | 95.6 | 95.1 |
| 150° C | 76.9 | 91.5 |
| 160° C | 58.4 | 85.5 |

[1] After heating for 120 hours.

The electric wire of the present invention can be produced by using well known equipments for producing the conventional wire coated with polyvinyl chloride resin composition.

Comparing the convention polyvinyl chloride coated wire, the electric wire of the present invention is much improved in flexibility and insulation resistance. Thus the latter has a high flexibility and a high insulation resistance at the same time. The latter's insulation resistance is ten or more times as high as the former's.

The latter, the present wire, is improved in weather resistance also. The latter's life reaches twice as long as the former's.

Further, the latter is improved in resistances to heat and aging. The latter's allowable temperature is higher than the former's by about 20° C. or more.

Further, dielectric constant of the present composition, e.g. 4.2 ($10^6$ c./s.), is much lower than the conventional polyvinyl chloride composition's, e.g. 6.2–7 ($10^6$ c./s.). Also dielectric dissipation factor of the present composition is ⅓ or less times as low as the conventional composition's.

Accordingly, the electric wire of the present invention can be used not only in the applications of the conventional polyvinyl chloride coated wire but also in various applications of much higher voltages for which the conventional one can not be used.

Furthermore, we have found that a calcined kaolin clay such as Kaolin Clay No. 33 (Southern Clays Inc.) or Burgess Pigment No. 30 is surprisingly effective as insulation improving agent for our vinyl chloride/monoolefin composition. Its amount is 1–70 phr., preferably 3–30 phr.

Also in the past, a calcined kaolin clay has been used as insulation improving agent for polyvinyl chloride coated wires. However, the effect is only such that the volume resistivity is increased from $10^{12}$ order to $10^{13}$ order when 10 or more phr. of calcined kaolin clay are used.

On the other hand, in the present invention, the volume resistivity is increased from $10^{13}$ order to $10^{15}$ order when 10–20 phr. of calcined kaolin clay are used, and for an increase of $10^1$ order in volume resistivity, such a small amount of clay as 3 phr. is sufficient.

EXAMPLES 1–3, REFERENCE EXAMPLES 1–4

Preparation of copolymer

Vinyl chloride/ethylene copolymers were prepared using 200-liters stainless steel autoclaves and according to the following specifications.

| Example | 1 | 2 | 3 |
|---|---|---|---|
| Water (l.) | 80 | 80 | 80 |
| Catalyst | [1] IPP | IPP | IPP |
| Catalyst amount (g.) | 23 | 26 | 55 |
| Suspending agent | [2] PVA | PVA | PVA |
| Suspending agent (g.) | 40 | 40 | 40 |
| Vinyl chloride (kg.) | 46 | 37 | 37 |
| Polymerization pressure (kg./cm.²) | 30 | 30 | 30 |
| Polymerization temperature (° C.) | 50 | 40 | 35 |
| Polymerization Time (hr.) | 20 | 20 | 20 |
| Yield (kg.) | 42 | 35 | 33.5 |
| Specific viscosity [3] | 0.380 | 0.364 | 0.433 |
| Ethylene content (wt. percent) | 5.4 | 9.4 | 12.3 |

[1] IPP=Diisopropyl peroxydicarbonate.
[2] PVA=Partially saponified polyvinyl alcohol.
[3] Specific viscosity: Polymer 4 g./l. cyclohexanon at 30° C.

Water and suspending agent are charged into the autoclave and admixed sufficiently. After flushing the autoclave with oxygen-free nitrogen, vinyl chloride is introduced and then ethylene is pressed thereinto until the predetermined pressure is obtained. Then catalyst is pressed thereinto and copolymerization is conducted at the predetermined temperature. During polymerization, the perssure is maintained at constant with allowance of ±0.5 kg./cm.² by withdrawing continuously ethylene from the autoclave by use of an automatic pressure controlling valve, the pressure otherwise rising gradually as the reaction proceeds. After the predetermined time, unreacted monomers are removed.

Preparation of compound

The following components were compounded to prepare compounds.

The above copolymer—100 parts by weight
Plasticizer—Listed in the below tables
Tribasic lead sulfate—3.5
Dibasic lead phosphite—1.5
Lead stearate—1.0
Butyl stearate—0.5

Determination of stiffness modulus

Press sheets (2 mm. thickness) were made of the above compounds according to the following conditions and their stiffness moduli were determined according to ASTM–D–1043–51T.

Blender—Two rolls (8″φ x 20″)
Blending time—10 min.
Blending temperature—120° C.
Pressing temperature—160° C.
Pressing time—10 min.
Pressing pressure—35 kg./cm.²

Determination of insulation resistance

The same compounds were kneaded at 100° C. for 1 hour with a ribbon blender and then coated wires were prepared according to the following conditions.

Extruder—40 mm. extruder
Extruder temperature—Back cylinder, 150° C., front cylinder, 170° C., head, 160° C.
Die temperature—160° C.
Screen—80 mesh, one; 100 mesh, one
Conductor—Soft copper wire
Conductor diameter—1 mm.
Vinyl coat thickness—0.8 mm.

Insulation resistances of coated wires thus obtained were determined according to JIS–C–3307.

COMPARATIVE TESTS (REFERENCE EXAMPLES)

For comparison, vinyl chloride homopolymers were compounded with plasticizer, and the stiffness moduli and insulation resistances were determined as above.

Using the compounds, coated wires were prepared as in Example 1 and insulation resistance, winding test, elongation after heating and tensile strength at normal temperature were determined according to JIS–C–3307. The results obtained are shown in the following tables.

|  | Ethylene content (percent) | Plasticizer (DOP) (part) | Stiffness modulus (kg./mm.$^2$) | Winding test at low temp. | Insulation resistance (M-ohm/km.) | Elongation after heating 120° C. | 140° C. | 150° C. |
|---|---|---|---|---|---|---|---|---|
| R. Ex.: |  |  |  |  |  |  |  |  |
| 5 | 0 | 50 | 4.32 | Pass | 4.09×10$^2$ | 88 | 60 | 55 |
| 6 | 0 | 60 | 3.11 | ....do.... | 5.41×10 | 89 | 54 | ____ |
| 7 | 1.6 | 20 | 15.22 | No pass | 2.38×10$^4$ | 95 | 93 | 85 |
| 8 | 1.6 | 40 | 4.55 | Pass | 3.76×10$^2$ | 92 | 74 | 52 |
| 9 | 19.3 | 20 | 2.39 | ....do.... | 5.22×10$^3$ | 92 | 83 | 59 |
| Ex : |  |  |  |  |  |  |  |  |
| 4 | 2.7 | 20 | 7.58 | Pass | 4.23×10$^4$ | 96 | 95 | 87 |
| 5 | 5.3 | 20 | 6.31 | ....do.... | 5.08×10$^4$ | 93 | 92 | 83 |
| 6 | 6.8 | 20 | 5.93 | ....do.... | 5.81×10$^4$ | 96 | 94 | 87 |
| 7 | 12.5 | 10 | 6.23 | ....do.... | 6.00×10$^4$ | 95 | 92 | 88 |
| 8 | 15.3 | 10 | 4.67 | ....do.... | 4.23×10$^4$ | 93 | 91 | 84 |

TEST RESULTS

|  | Ex. 1 | Ex. 3 | R. Ex. 1 | R. Ex. 2 |
|---|---|---|---|---|
| Plasticizer (phr.) (DOP) | 20 | 15 | 40 | 50 |
| Stiffness modulus (kg./mm.$^2$) | 6.35 | 4.29 | 6.22 | 4.56 |
| Insulation resistance (M-ohm/km.) | 1.85×10$^3$ | 5.96×10$^2$ | 1.7×10$^2$ | 4.4×10 |

|  | Ex. 2 | R. Ex. 3 | R. Ex. 4 |
|---|---|---|---|
| Plasticizer (phr.) (DOP) | 20 | 26 | 30 |
| Insulation resistance (M-ohm/km.) | 7.36×10$^2$ | 7.43×10$^2$ | 6.1×10$^2$ |
| Stiffness modulus (kg./mm.$^2$) | 4.45 | 11.5 | 8.25 |

As apparent from the comparison of Ex. 1 with R. Ex. 1 or Ex. 3 with R. Ex. 2, the electric wire of the present invention has much improved insulation resistance of 10 times as high as the conventional one, when substantially equal flexibility.

Further, as apparent from the comparison of Ex. 2 with R. Ex. 3 or Ex. 3 with R. Ex. 4, the conventional wire having insulation resistance substantially equal to Ex. 2 or Ex. 3 has very poor flexibility.

In short, the electric wire of the present invention has a high flexibility and a high insulation resistance at the same time, differently from the conventional one.

EXAMPLES 4–12, REFERENCE EXAMPLES 5–12

Vinyl chloride/ethylene copolymers having different ethylene contents were prepared as in Example 1 but polymerization temperature 10–40° C. and polymerization pressure 10–60 kg./cm.$^2$.

The copolymers were compounded with an amount of plasticizer listed in the below tables, 10 phr. of Kaolin Clay No. 33 (Southern Clays Inc.), 4 phr. of tribasic lead sulfate, 1.5 phr. of dibasic lead phosphite and 0.5 phr. of A. C. Polyethylene 6A (Allied Chemical Corp.).

As apparent from the above, the resin compositions comprising vinyl chloride/ethylene copolymer having ethylene contents of 2–16% by weight, are improved in any property of winding test at low temperature, insulation resistance and elongation after heating.

|  | Ethylene content (percent) | Plasticizer (DOP) (part) | Stiffness modulus (kg./mm.) | Winding test at low temp. | Insulation resistance (M-ohm/km.) | Elongation after heating 120° C. | 140° C. | 150° C. |
|---|---|---|---|---|---|---|---|---|
| Ex.: |  |  |  |  |  |  |  |  |
| 5 | 5.3 | 20 | 6.31 | Pass | 5.08×10$^4$ | 97 | 92 | 83 |
| 9 | 5.3 | 30 | 4.27 | ....do.... | 2.51×10$^4$ | 95 | 93 | 83 |
| 10 | 5.3 | 35 | 3.62 | ....do.... | 6.40×10$^3$ | 92 | 89 | 67 |
| 11 | 5.3 | 40 | 2.91 | ....do.... | 7.26×10$^2$ | 92 | 86 | 59 |
| R. Ex.: |  |  |  |  |  |  |  |  |
| 10 | 5.3 | 45 | 2.42 | Pass | 7.26×10$^2$ | 90 | 76 | 49 |
| 6 | 0 | 60 | 3.11 | ....do.... | 5.41×10 | 89 | 54 | ____ |

As apparent from the above, when the proportion of plasticizer is too large, the insulation resistance and the elongation after heating are poor and when the proportion is small, the properties are good.

|  | Ethylene content (percent) | Plasticizer (DOP) (part) | Stiffness modulus (kg./mm.$^2$) | Winding test at low temp. | Insulation resistance (M-ohm/km.) | Elongation after heating 120° C. | 140° C. | 150° C. |
|---|---|---|---|---|---|---|---|---|
| R. Ex.: |  |  |  |  |  |  |  |  |
| 9 | 19.3 | 20 | 2.39 | Pass | 5.22×10$^3$ | 92 | 83 | 59 |
| 11* | 5.3 | 20 | 10.24 | No pass | 3.90×10$^4$ | 96 | 90 | 84 |
| Ex.: |  |  |  |  |  |  |  |  |
| 5 | 5.3 | 20 | 6.31 | Pass | 5.08×10$^4$ | 97 | 92 | 83 |
| 12 | 15.3 | 20 | 3.47 | ....do.... | 1.22×10$^4$ | 94 | 86 | 65 |

*50 phr. of calcium carbonate were added to the resin composition.

As apparent from the above, when the stiffness modulus of the composition is smaller than 250 kg./cm.$^2$, the elongation after heating is insufficient and when the stiffness modulus is made larger than 1000 kg./cm.$^2$ by adding calcium carbonate ( R. Ex. 11), the result of winding test at low temperature is bad.

EXAMPLE 13, REFERENCE EXAMPLE 12

Using the wires of Example 5 and Reference Example 6 respectively, elongation residual ratios were examined after heating at various temperatures for 120 hours, according to JIS–C–3307.

|  | Ex. 13, percent | R. Ex. 12, percent |
|---|---|---|
| Heating temperature: |  |  |
| 120° C | 96 | 88 |
| 140° C | 94 | 60 |
| 150° C | 87 | 55 |
| 160° C | 79 | 39 |

As apparent from the preceding, the wire of the present invention is improved in heat resistance by 30° C. or more, compared with the conventional polyvinyl chloride coated wire.

EXAMPLE 14, REFERENCE EXAMPLE 13

Vinyl chloride/ethylene copolymer having ethylene content of 9.1% and specific viscosity of 0.452 was prepared as in Example 1.

The copolymer was compounded with 20 phr. of DOP, 2.5 phr. of tribasic lead sulfate, 1.0 phr. of dibasic lead phosphite and 0.5 phr. of butyl stearate.

Using this compound, a coated wire having outer diameter of 2.6 mm. was prepared and weathering test was made according to the following conditions.

Test machine—Twin carbon arc weather-O-meter
Test temperature—Black panel temperature 60° C.
Water spray—18 min./in. 120 min.
Determination—According to JIS-C-3307

Irradiation time and elongation residual ratio are shown in the following table.

The stiffness modulus and the insulation resistance of the above compound were 4.41 kg./cm.$^2$ and $2.03 \times 10^3$ respectively.

For comparison, a similar compound but comprising vinyl chloride homopolymer plus 50 phr. of DOP in place of the vinyl chloride/ethylene copolymer was tested (Reference Example 13).

|  | Ex. 14, Percent | R. Ex. 13, Percent |
| --- | --- | --- |
| Irradiation time (hr.): |  |  |
| 400 | 98.1 | 96.4 |
| 800 | 89.4 | 72.2 |
| 1,200 | 75.3 | 12.2 |
| 1,600 | 26.1 | 1.3 |

As apparent from the above, the wire of the present invention is much improved in weather resistance.

EXAMPLE 15, REFERENCE EXAMPLE 14

With the sheets of Example 3 and Reference Example 2, dielectric constant and dielectric dissipation factor were determined at 20° C. (Example 15 and Reference Example 14).

|  | Ex. 15 | R. Ex. 14 |
| --- | --- | --- |
| Dielectric constant | 4.35 | 5.9 |
| Dielectric dissipation factor | 0.026 | 0.069 |

As apparent from the above, the wire of the invention is remarkably improved in dielectric constant and dielectric dissipation factor.

EXAMPLES 16–25, REFERENCE EXAMPLES 15–24

To 100 parts of vinyl chloride/ethylene copolymer having ethylene content of 6.09%, were added 30 parts of DOP, 4 parts of tribasic lead sulfate, 1.5 parts of dibasic lead phosphite, 0.5 part of A. C. Polyethylene 6A (Allied Chemical Inc.) and kaolin clay in amount of 0, 1, 3, 5, 10, 15, 20, 30, 50, 70 parts respectively and the mixture was kneaded in 8"φ x 20" roll at 120° C. for 10 minutes to make sheets of 0.53 mm. thickness. Each four of the above sheets were laminated and pressed at 160° C. for 10 minutes to make a sheet of 2 mm. thickness. With the respective sheet, volume respectively was determined according to JIS-K-6723 and stiffness modulus according to ASTM-D-1023 (Examples 16–25).

For comparison, also with similar compounds as above but comprising 100 parts of vinyl chloride homopolymer plus 50 parts of N-dioctyl phthalate in place of vinyl chloride/ethylene copolymer plus 30 parts of DOP, the same tests were made (Reference Examples 15–24).

|  | Kaolin modulus clay (p.h.r.) | Stiffness modulus (kg./mm.) | Volume resistivity (ohm-cm.) |
| --- | --- | --- | --- |
| Ex. No.: |  |  |  |
| 16 | 0 | 3.95 | $7.6 \times 10^{13}$ |
| 17 | 1 | 3.80 | $9.8 \times 10^{13}$ |
| 18 | 3 | 3.99 | $4.3 \times 10^{14}$ |
| 19 | 5 | 4.05 | $1.1 \times 10^{16}$ |
| 20 | 10 | 4.15 | $5.2 \times 10^{15}$ |
| 21 | 15 | 4.28 | $7.3 \times 10^{15}$ |
| 22 | 20 | 4.40 | $6.9 \times 10^{15}$ |
| 23 | 30 | 4.95 | $4.8 \times 10^{15}$ |
| 24 | 50 | 6.25 | $9.4 \times 10^{14}$ |
| 25 | 70 | 8.13 | $3.1 \times 10^{14}$ |
| Ex. No.: |  |  |  |
| 15 | 0 | 4.31 | $6.2 \times 10^{12}$ |
| 16 | 1 | 4.33 | $6.4 \times 10^{12}$ |
| 17 | 3 | 4.42 | $8.5 \times 10^{12}$ |
| 18 | 5 | 4.46 | $2.1 \times 10^{13}$ |
| 19 | 10 | 4.55 | $5.2 \times 10^{13}$ |
| 20 | 15 | 4.77 | $7.9 \times 10^{13}$ |
| 21 | 20 | 4.83 | $9.4 \times 10^{13}$ |
| 22 | 30 | 5.25 | $7.5 \times 10^{13}$ |
| 23 | 50 | 7.18 | $3.8 \times 10^{13}$ |
| 24 | 70 | 9.87 | $9.7 \times 10^{12}$ |

As apparent from the above, when a calcined kaolin clay is added to the vinyl chloride/ethylene copolymer resin composition, greater increase in volume resistivity is obtained, than in the case of adding the clay to the vinyl chloride homopolymer resin composition.

EXAMPLE 26

A wire was prepared as in Example 2, except that vinyl chloride/propylene copolymer having propylene content of 3.5% was used in place of the vinyl chloride/ethylene copolymer. Then the properties of the wire were determined in the same way as in Example 4 but under the temperature conditions of back cylinder 150° C., front cylinder 170° C., head 165° C. and die 165° C. As the result, the tensile strength was 2.77 kg./cm.$^2$, the insulation resistance was $4.61 \times 10^4$M ohm/km., the elongation residual ratio after heating was 94% at 120° C., 90% at 140° C. and 72% at 160° C. respectively.

What is claimed is:

1. An electric wire coated with a resin composition which comprises (a) 100 parts by weight of a vinylchloride copolymer containing from 2 to 16% by weight of a monoolefin having up to 4 carbon atoms per molecule, (b) from 1 to 40 parts by weight of a plasticizer, (c) from 0.5 to 3.0 parts by weight of dibasic lead phosphite, and (d) from 1 to 70 parts by weight of a calcined kaolin clay; said resin composition having a stiffness modulus from 10.0 to 2.5 kg./mm.$^2$ (determined at 25° C.).

2. The electric wire according to claim 1 wherein the monoolefin is ethylene.

3. The electric wire according to claim 1 wherein the resin composition has a stiffness modulus lower than 9.0 kg./mm.$^2$ and a volume resistivity higher than $5 \times 10^{13}$ ohm-cm.

References Cited

UNITED STATES PATENTS

| 2,534,108 | 12/1950 | De Nie et al. | 260—87.5 |
| 2,713,563 | 7/1955 | Kuhn | 260—87.5 |
| 3,278,477 | 10/1966 | Evans. |  |
| 2,674,585 | 4/1954 | Condo et al. | 260—87.5 |
| 2,674,593 | 4/1954 | Condo et al. | 260—87.5 |
| 2,689,836 | 9/1954 | Bier | 260—87.5 |
| 3,111,505 | 11/1963 | Rust et al. | 260—87.5 |
| 3,248,375 | 4/1966 | Erbaugh | 260—87.5 |
| 3,324,097 | 6/1967 | Pears | 260—87.5 |
| 3,373,150 | 3/1968 | Pears | 260—87.5 |
| 3,399,157 | 8/1968 | Deex et al. | 260—87.5 |

WILLIAM D. MARTIN, Primary Examiner

R. M. SPEER, Assistant Examiner

U.S. Cl. X.R.

117—128.4, 161